United States Patent [19]

Kronenberg

[11] Patent Number: 5,059,803
[45] Date of Patent: Oct. 22, 1991

[54] RUGGED ALPHA PARTICLE COUNTER

[75] Inventor: Stanley Kronenberg, Skillman, N.J.

[73] Assignee: The United States of America as represented by the Secretary of the Army, Washington, D.C.

[21] Appl. No.: 554,508

[22] Filed: Jul. 19, 1990

[51] Int. Cl.$^5$ .......................... H01J 47/00; G01T 1/18
[52] U.S. Cl. ................................ 250/385.1; 250/253; 250/255; 250/374; 324/464
[58] Field of Search ....................... 324/71.4, 464, 469; 340/632; 250/374, 353, 385, 255

[56] References Cited

U.S. PATENT DOCUMENTS

| | | | |
|---|---|---|---|
| 3,093,738 | 6/1963 | Mann et al. | 250/374 |
| 3,878,496 | 4/1975 | Erickson | 250/374 |
| 3,984,690 | 10/1976 | Marshall, III et al. | 250/374 |
| 4,262,203 | 4/1981 | Overhoff | 250/380 |
| 4,527,064 | 7/1985 | Anderson | 250/374 |
| 4,686,368 | 4/1985 | Anderson et al. | 250/385.1 |
| 4,804,847 | 2/1989 | Uber, III | 250/374 |
| 4,859,854 | 8/1989 | Kershner et al. | 250/374 |

FOREIGN PATENT DOCUMENTS

| | | | |
|---|---|---|---|
| 99630 | 6/1983 | Japan | 98/42.04 |
| 1189233 | 6/1988 | U.S.S.R. | 250/374 |

OTHER PUBLICATIONS

The Journal Friday Home Report, 6/2/89, R26 "Electronic Radon Detectors Are Effective"Dilly.

Primary Examiner—Kenneth A. Wieder
Assistant Examiner—Maura K. Regan
Attorney, Agent, or Firm—Michael Zelenka; William H. Anderson

[57] ABSTRACT

An alpha particle counter for detecting individual alpha particles with a detection medium which is ambient air. Energetic alpha particles from radioactive decay products or other sources enter the detector volume through a durable wire screen window and ionize the ambient air detection medium. Ions of one polarity are driven to the central collector electrode by an electric field due to a battery imposed potential difference between the outer electrode and the central electrode and housing. One pulse is produced for each alpha particle losing its energy in the detector. The counting efficiency is substantially one hundred percent (100%) and is relatively noise free because the collector electrode is essentially at ground potential. The collector electrode signal is amplified in a field effect transistor (FET) emitter follower circuit, the output of which is fed to an external counter. Rugged construction and minimum maintenance are inherent features of this alpha particle detector.

11 Claims, 6 Drawing Sheets

RUGGED ALPHA PARTICLE COUNTER

The invention described herein may be manufactured, used, and licensed by or for the Government of the United States for governmental purposes without the payment to me of any royalties thereon.

FIELD OF THE INVENTION

This invention is related to the field of alpha particle detectors which use ambient air as the detection medium for counting individual alpha particles with one hundred percent (100%) efficiency and which are essentially unaffected by other radiation such as gamma and beta rays and, in particular, to an alpha particle detector which is sufficiently rugged and simple for use under adverse conditions in the field.

BACKGROUND OF THE INVENTION

Three (3) kinds of alpha particle detectors for alpha particle counting are available in the prior art: the scintillation counter, the gas counter including both Geiger and proportional types, and the solid state junction counter.

The scintillation counter was historically the first to be utilized in early experiments on radioactivity in which the scintillator was viewed with a microscope to count the individual flashes of light produced by each alpha particle stopping event. In the modern scintillation counter, scintillation material is deposited on the photocathode of a photomultiplier tube which amplifies the signal and provides information about the energy of the alpha particle in addition to simply counting the alpha particle. The acceptance window must be thin enough to pass low energy alpha particles but thick enough to form an opaque light seal. The result is a window which is vulnerable to scratching, scores and puncture. Clearly, the scintillation counter is not well suited for alpha particle detection and counting under severe conditions, such as those present in military operations in the field.

Gas-filled alpha particle detectors use a specific gas as the detector material depending upon whether the mode of operation is as a Geiger counter or as an ionization/proportional counter. In either case, the working gas is hermetically sealed. Entrance to the ionization zone by the incoming alpha particle is through a thin, fragile plastic or metal window. The output signal pulse is constant in the Geiger counter operation but is related to the energy of the alpha particle in the ionization or proportional counter operation. The existence of delicate windows for the entrance apertures for the incoming alpha particles make gas filled counters unsatisfactory for use in a rough and hazardous environment, such as that of military operations in the field.

The junction counter is a solid state p-n junction with a reverse bias which collects ionization charge from the passage of an alpha particle through the depletion layer. It can be made compact and portable. The limitation of the junction counter lies in the stringent requirements for avoiding scratching and abrasion of the coating over the metallic electrode window surface of the detector. This electrode is light sensitive and the coating serves to block ambient light. The coating is easily broken resulting in a light leak. Equally important, the active surface of the detector must be kept free of moisture and dust. At least one amplification stage is required to register an event whereas several stages of amplification are typically necessary to extract energy information. Because of the vulnerability of the active surface and the care which must be given to it, the junction detector is not suitable for routine service under extreme conditions such as those found in military field operations.

None of the three (3) types of alpha particle counters currently available is a satisfactory choice for alpha particle detection and counting under severe or hazardous conditions. This shortcoming has been recognized by the military services in the form of a Joint-Service Operational Requirement (JSOR) entitled "Alpha Radiation Detection and Measurement System" issued Feb. 12, 1987. The purpose of the required system is stated:

"The desired alpha radiation detection and measurement system will be used worldwide for peacetime operational health physics applications, i.e. nuclear weapons accidents contamination control, and 'hot line' monitoring."

The JSOR defines the need for an alpha particle detector as follows:

"The military services and defense agencies require a rugged state-of-art alpha radiation detection system to detect and quantify alpha radiation levels, e.g. plutonium, uranium and daughter products, with sufficient sensitivity at low levels for the release for uncontrolled use and at high levels to meet operational safety and health requirements."

"Alpha emitting radioisotopes possessed by the military services and defense agencies can be involved in an accident during storage, maintenance, transport, or other operational activities. These alpha emitters could be dispersed in the environment producing radioactive contamination and pose a potential health hazard."

The JSOR concludes that existing alpha particle detection and counting systems are not suitable for the needs of the military.

SUMMARY OF THE INVENTION

The rugged alpha particle detector disclosed herein includes an outer cylindrical electrode, constituting a first electrode, which is closed at one end by a metal screen. The screen admits alpha particles but excludes RF interference, and the first electrode is mounted to a housing at the other end by an insulating ring. The detection medium is ambient air inside of the first electrode. A second electrode is mounted concentrically within the first cylindrical electrode and is of much smaller radius and is shorter in length. The housing encloses or mounts the components. The outer electrode is electrically biased negatively with respect to the housing and inner electrode by means of a battery. The inner electrode is directly connected to the base of a field effect transistor (FET) which amplifies the signal in an emitter-follower configuration.

When an alpha particle produces ionization in the cylindrical detection volume, the inner electrode produces a voltage pulse at the base of the FET which in turn amplifies the signal for output to the count register or analyzer. The emitter-follower circuit is completed inside the chassis by a battery which connects the chassis to the collector of the FET. The emitter of the FET is connected to the chassis through a dropping resistor. An attenuating resistor keeps the inner electrode terminated to the same potential as the chassis.

Each energetic alpha particle which enters the detection volume and is stopped there produces an individual pulse. The count analyzer external to the detector can register the individual events, compute a time rate of count, activate visual or audible alarms when rates exceed a preset value or some combination of these functions.

Because the counter of the present invention has no window to break or surface which could be scratched, the counter can be ruggedly and compactly constructed, is readily portable, is simple to operate and maintain, and detects with a one hundred percent (100%) efficiency. By this it is meant that each alpha particle which enters the sensitive air volume between the electrodes with sufficient energy produces an event. Thus the alpha particle detector disclosed herein satisfies the requirement for quantitative measurement of alpha particle flux in field monitoring operations.

These and other objects of the present invention will become apparent from a reading of the following specification, taken in conjunction with the enclosed drawings.

DETAILED DESCRIPTION OF THE PREFERRED EMBODIMENT

Figure 1:
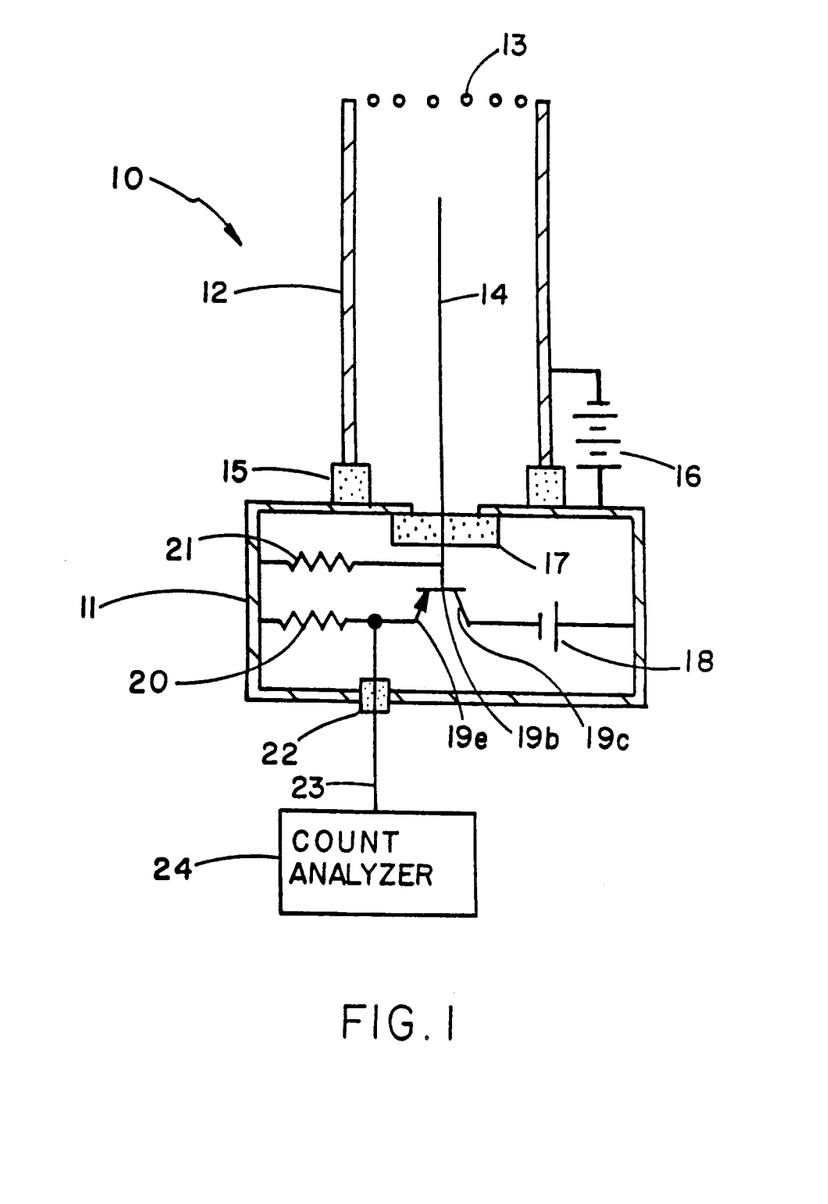
FIG. 1 is a diagram of the cylindrical alpha particle detector which embodies the invention.

With reference to FIG. 1, energetic alpha particles enter the cylindrical outer electrode 12 through a wire screen 13 which is the rugged acceptance window for alpha particle flux. The outside electrode 12 is biased with respect to the housing by a battery 16. The potential difference between the outer electrode 12 and the inner electrode 14 (which is terminated to the housing 11 by resistor 21) produces an electric field which collects the negative ions on the inner electrode 14 with the battery polarity shown. Ions collected on the inner electrode 14 produce a voltage pulse on the inner electrode which is given by the formula:

$$V_p = \frac{E(eV)}{32} \times 1.6 \times 10^{-19} \times C^{-1} \text{ Volts} \tag{1}$$

Here, E is the energy lost by the alpha particle in the detector, and C is the capacitance of the collector. The energy E is typically 3 MeV, and C is approximately $2 \times 10^{-12}$ F. Consequently, the typical pulse height is 7.5 mV. This pulse decays with a built-in time constant $\uparrow = RC$, where R is the resistance of FET 19. The voltage pulse from an alpha particle collection event is delivered to the base 19b of FET 19 which is connected in an emitter-follower configuration so that an amplified signal is delivered through output lead 23 through chassis leadthrough 22.

The bias potential with respect to the chassis is imposed on the outer electrode rather than on the inner electrode. This is a form of "guard ring" design. There may be leakage between the electrode to which the potential is applied and the body of the device (the body is at ground potential). This leakage does not contribute to the signal. The collecting electrode is at ground potential, and therefore no leakage is possible since there is no potential difference between the collecting electrode and ground. The result of this biasing is that electrical noise and leaks due to contamination, chemical vapors and moisture coating the insulating base or ring 15 do not produce a current which may effect the input bias. This feature makes the invention particularly applicable to environments with high moisture, chemical vapor or particle laden atmospheres.

Figure 2:
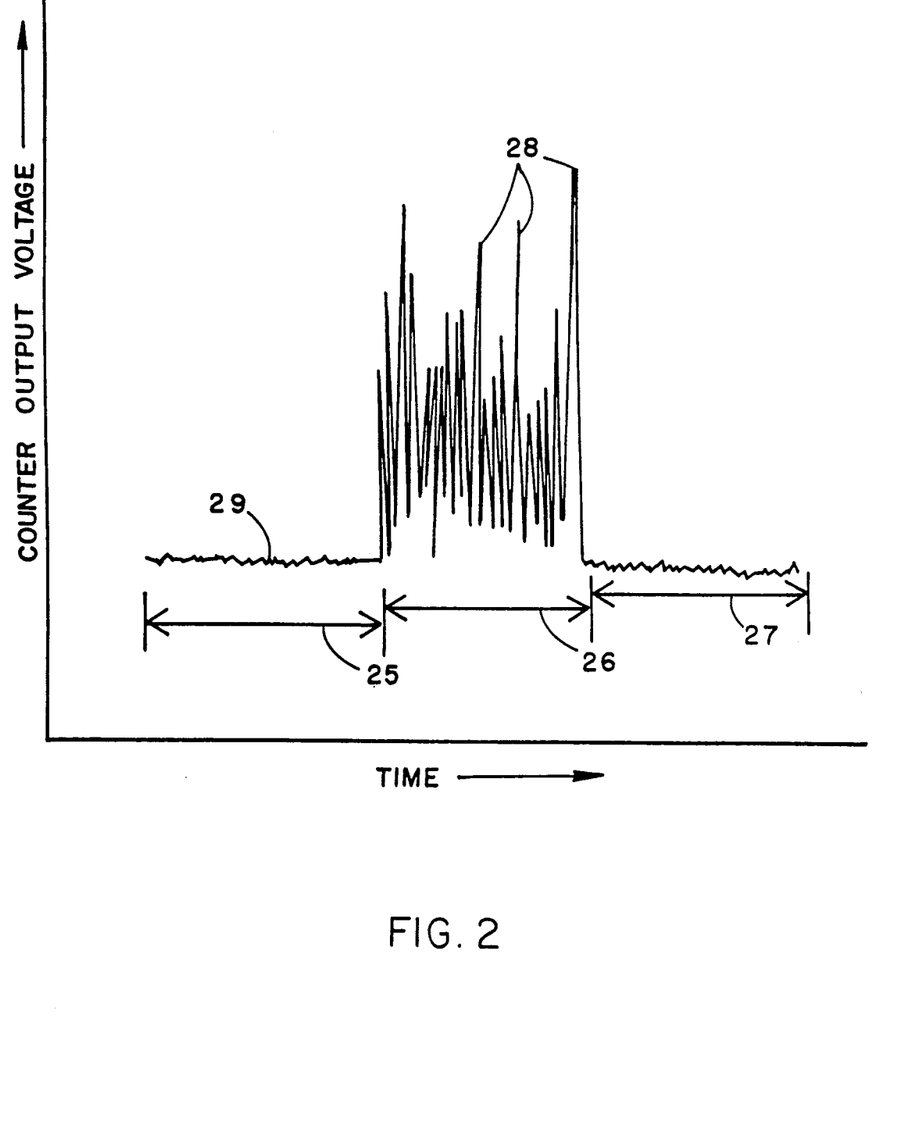
FIG. 2 is the chart recorder output of the alpha particle detector amplified by a Hewlett Packard Electrometer wherein the output is recorded under three conditions: only gamma ray radiation, 3 MeV alpha particle radiation, and no incident radiation.

The output from a cylindrical detector such as the embodiment in FIG. 1 is shown in FIG. 2. The three segments of the chart recorder plot of the counter output voltage verses time correspond to three conditions. In the first segment 25, the detector is exposed to gamma-ray radiation which produces no measurable output. In the second segment 26, the detector is subjected to an alpha particle flux from thorium at the rate of 2.3 alpha particles per second The trace of the individual detection events 28 is obvious. The difference in the pulse heights is due to the fact that many alpha particles do not lose all of their energy in the ionization zone where all of the ion products can be collected. The production of a clean, useful pulse for each event facilitates subsequent tabulation and analysis by a variety of circuits. The third segment 27 of the plot shows the lack of response for no radiation whatsoever.

Figure 3:
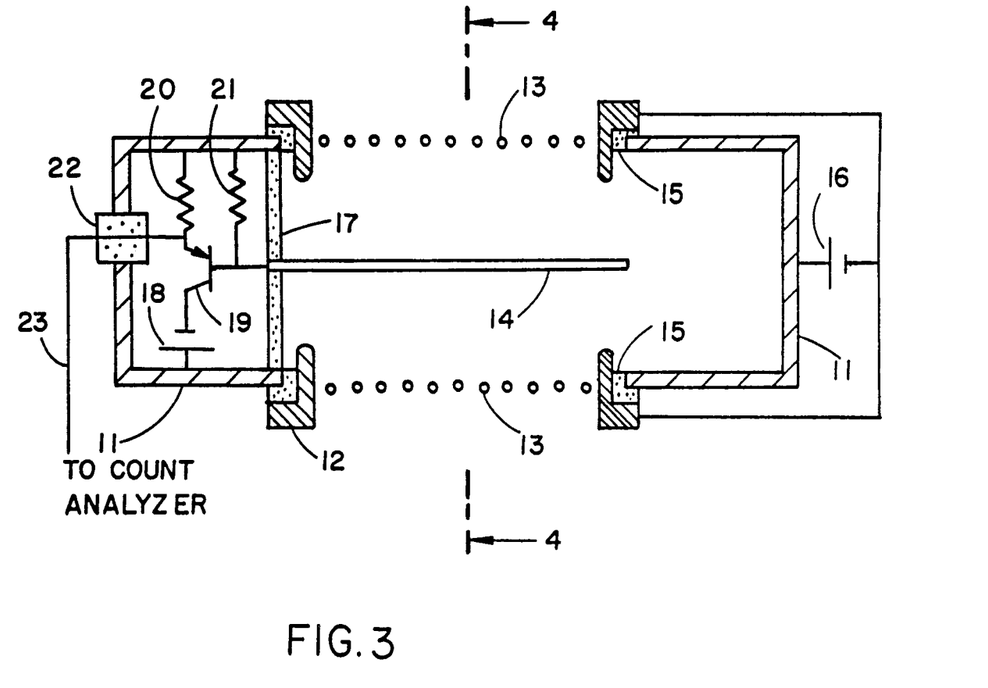
FIG. 3 is an array of detector modules which embody the invention.
Figure 4:
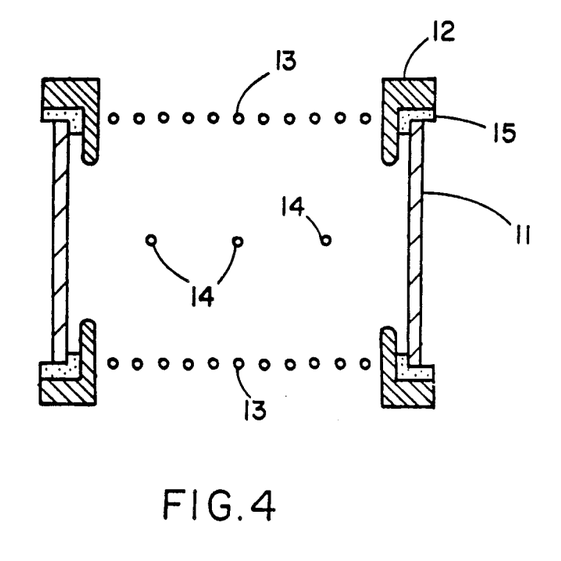
FIG. 4 is a cross-sectional view, taken across the lines 4—4 of FIG. 3.

The embodiment shown in FIG. 3 and in FIG. 4 has a large acceptance solid angle for incoming alpha particle flux since wire screen windows 13 comprise both opposing sides of a rectangular detector volume. Inside the detector volume there is an array of signal collector electrodes 14, in this embodiment three in number, disposed centrally between and parallel to the screens 13 and parallel to each other. An alpha particle entering the detector through either screen window 13 produces ions along the track of its range. The screen window 13 is biased to a negative potential by battery 16 with respect to the casing 11 and the collector electrodes 14 which are terminated to the case by resistor 21. Negative ions produced by an alpha particle are collected by electrodes 14 and produce a voltage pulse in accord with equation (1). The pulse is delivered to the base of a field effect transistor (FET) 19 which amplified the pulse in an emitter-follower circuit with output conductor 23 connected to an appropriate count analyzer. The three collector electrodes 14 are mounted in and supported by insulator 17 and may be connected in parallel to the base of the FET 19 provided that total capacitance is sufficiently small. Otherwise, each collector electrode will have an emitter-follower connected to it alone. The see-through geometry of opposing screen windows 13 maximizes the refreshment of the ambient air detection material. Insulation 15 is provided between the frame 12 of the cathode mounting screen 13 and housing chassis 11. Battery 16 biases the potential of both window frames 12 and screens 13 with respect to the housing 11. Biasing the outer electrode 12 and screen 13 rather than the inner electrode 14 eliminates the risk of fictitious event counts due to electronic noise in insulation 15 due to moisture, dust or chemical condensates.

Figure 5:
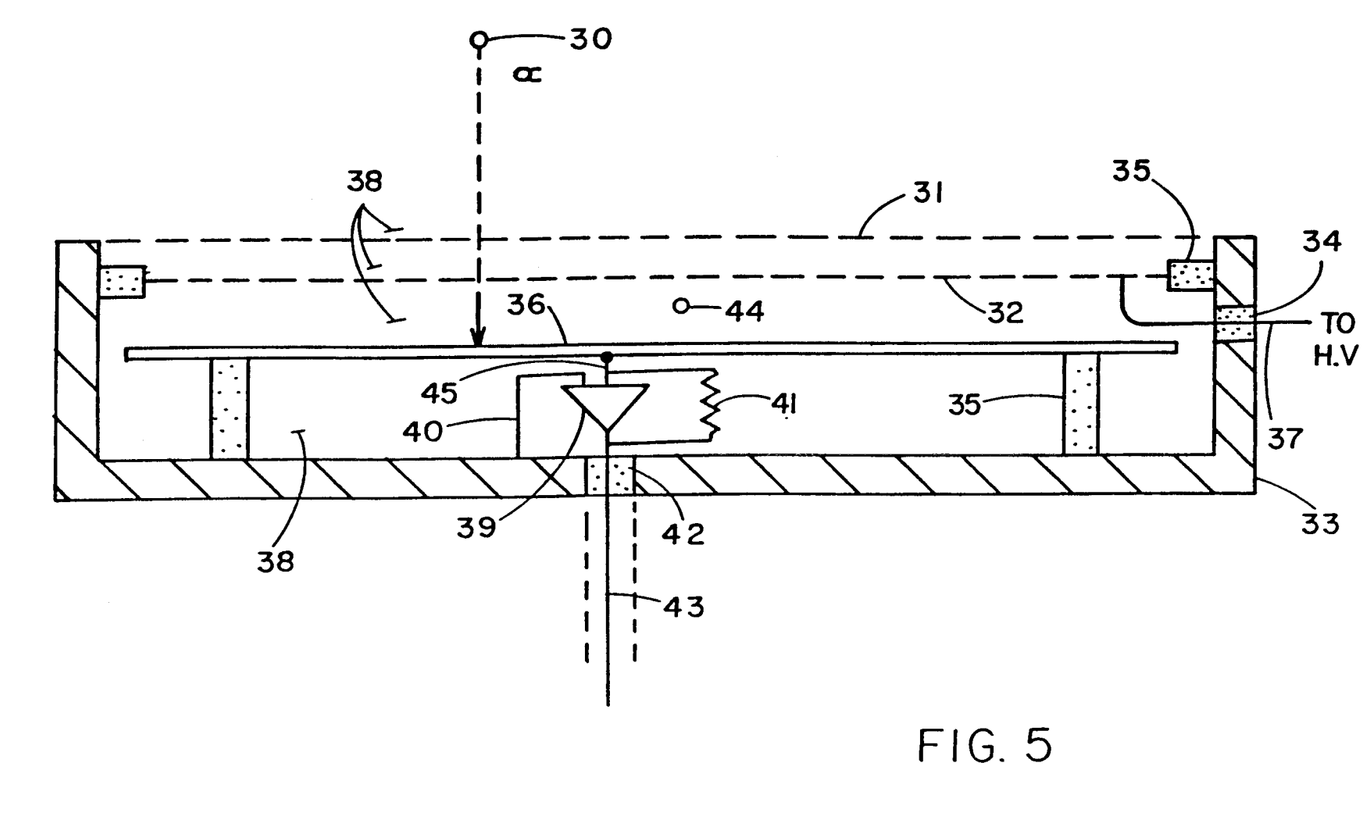
FIG. 5 is a large surface area ambient air alpha particle counter.

FIG. 5 is a cross section of a large surface area embodiment of the ambient air alpha particle counter disclosed herein. An alpha particle 30 incident upon the counter passes through grounded wire mesh 31, then through energized wire mesh 32 and into the active counting zone 44 between the energized wire mesh 32 and the ion collecting electrode 36. Mesh 32 is energized to high voltage by connection 37 to a high voltage source (not shown). The collection of the ions produced in ambient air 38 in the counting zone 44 produces a pulse which is carried by lead 45 to the electrometer integrated circuit (IC) 39. The output pulse from the electrometer IC is carried by lead 43 through the casing wall 33 by feed through 42. The signal conductor to the count analyzer outside the casing 33 is a shielded cable.

Figure 6:
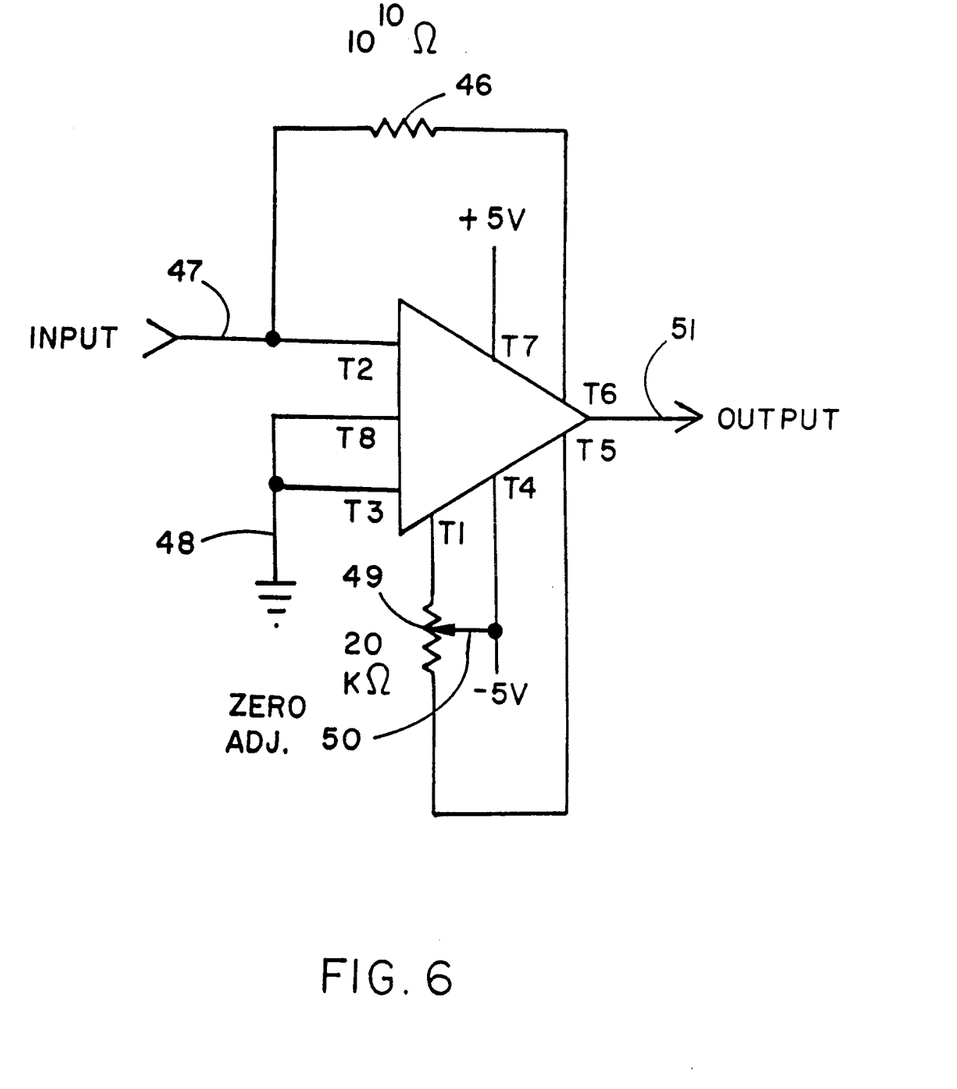
FIG. 6 is a circuit schematic for the connections of an electrometer integrated circuit in the embodiment in FIG. 5.

FIG. 6 shows the connection diagram for an electrometer integrated circuit, for example model ICH 8500, which is well suited to incorporation in embodiments of the present invention. Terminal T1 is connected through resistors 46 and 49 to terminal T2 and the input 47. Example values of resistors 46 and 49 are $10^{10}$ and $5 \times 10^4$ ohms, respectively. Resistor 49 is a potential dividing resistor in a zero adjust rheostat. Terminal T3 and T8 are connected to ground. A shielded cable output 51 is connected to terminals T5 and T6.

Figure 7:
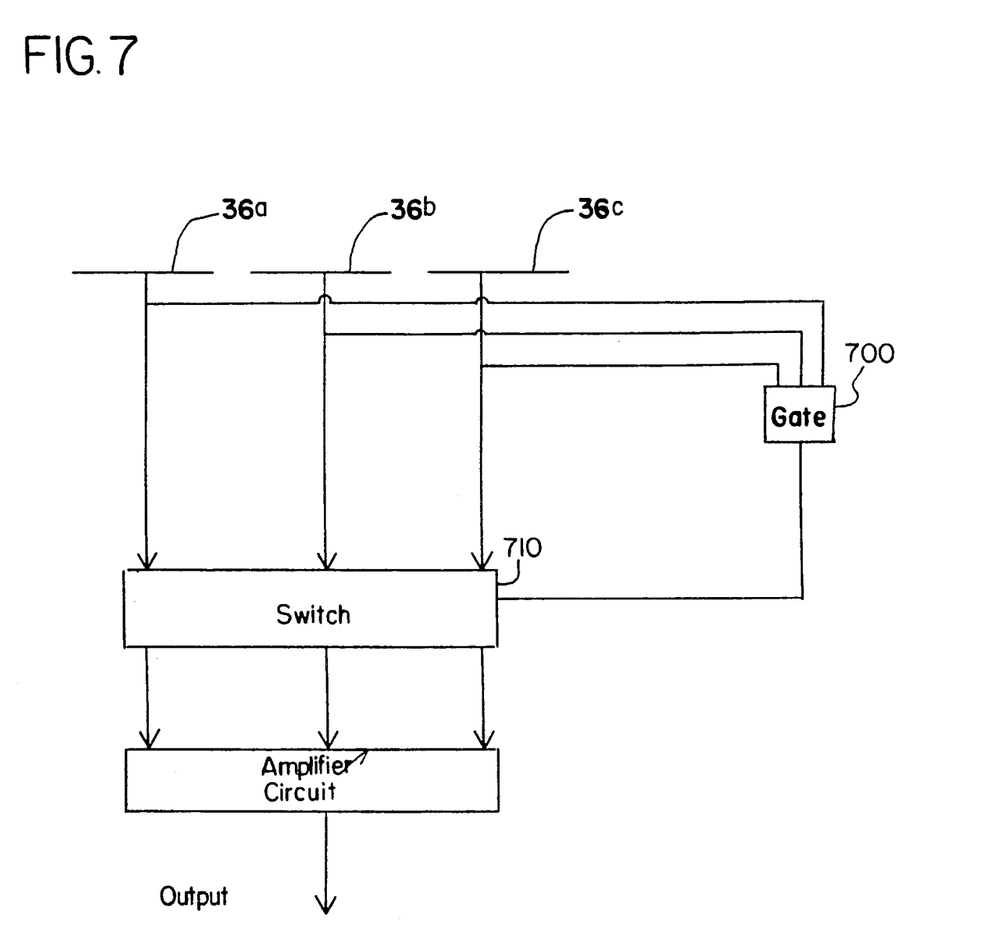
FIG. 7 is a diagram of an embodiment of the present invention which compensates for microphonic interference.

FIG. 7 is an embodiment of the present invention that compensates for microphonic interference. Because the alpha particle detector as described above is susceptible to microphonic interference, it would be advantageous to have the collecting electrode 36 of FIG. 5 be divided into at least different sections. Because microphonic interference would effect all three portions of the electrode 36 of FIG. 5 simultaneously and because ionization due to alpha particles would only effect at the most two portions of electrode 36 of FIG. 5, the voltage pulses from microphonic interference can be eliminated by selectively eliminating those voltage pulses emanating from all the portions of electrode 36 of FIG. 5 simultaneously.

As illustrated in FIG. 7, electrode 36 of FIG. 5 may be divided into electrodes 36a, 36b, and 36c. The output of all three electrode portions 36a, 36b, and 36c, then, may be fed through a gate circuit 700 which selectively inputs a signal to a switch 710 when all three electrodes portions 36a, 36b, and 36c produce a voltage pulse simultaneously. The signal from the gate circuit 700 would inactivate the switch 710, thereby stopping the voltage pulse caused by microphonic interference from being detected by the counter circuit.

There are several other methods of suppressing microphonic interference in a device such a the one disclosed herein. All these methods are well known in the art and need no further elaboration.

For the same reasons that the single module cylindrical embodiment of FIG. 1 is negligibly sensitive to radiation other than alpha particles, the embodiment in FIGS. 3, 4, and 5 are also highly alpha particle specific with only a slight response to other radiation such as x-rays, gamma rays or beta rays.

The embodiments of the invention shown in FIGS. 1, 3, 4, and 5 are one hundred percent (100%) efficient. That means that every alpha particle produced by radioactivity which deposits a minimal portion of its energy in the sensitive volume of the counter will be counted with the probability of one hundred percent (100%).

Obviously, many modifications may be made without departing from the basic spirit of the present invention. Accordingly, it will be appreciated by those skilled in the art that within the scope of the appended claims, the invention may be practiced other than as been specifically described herein.

What is claimed is:

1. A portable rugged alpha particle detector for counting alpha particle radiation, comprising a housing, a first electrode having an aperture open to ambient air and carried by the housing, insulation means between the first electrode and the housing, a wire screen cover for the first electrode aperture opposite the housing, a second electrode carried by the housing and disposed adjacent to the first electrode, a field effect transistor within the housing and having respective emitter, collector and base terminals, a first battery connected between the first electrode and the housing providing a negative bias on the first electrode with respect to the second electrode, a second battery connected between the housing and the collector terminal of the field effect transistor, a dropping resistor between the housing and the emitter of the field effect transistor, an attenuating resistor between the base terminal and the housing, means for connecting the base terminal and the second electrode, an external count analyzer, and a means for connecting the count analyzer to the junction of the dropping resistor and the emitter terminal of the field effect transistor, whereby the transistor operates as an emitter follower amplifier producing single voltage pulses for each energetic alpha particle which enters the first electrode through the wire screen and loses its energy by ionization of the ambient air within the first electrode.

2. The alpha particle detector of claim 1, wherein the first electrode comprises an external electrode made substantially of wire mesh to increase sensitivity of the alpha particle detector.

3. The alpha particle detector of claim 1, wherein the FET emitter follower is replaced by an electrometer integrated circuit.

4. The alpha particle detector of claim 1, wherein said count analyzer is capable of producing an electrical signal at predetermined count of voltage pulses and wherein said count analyzer is electrically connected to an alarm means which is activated by said count analyzer.

5. The alpha particle detector of claim 1, wherein the detector material is ambient air.

6. A portable rugged alpha particle detector comprising a housing, a first electrode exposed to ambient air and carried by the housing, at least three central electrodes carried by the housing, an amplifier electrically connected to the central electrodes, a battery connected between the first electrode and the housing, an external counter electrically connected to the amplifier, and means to selectively preclude voltage pulses produced by all the central electrodes simultaneously placed in series with the amplifier, whereby the amplifier produces a single voltage pulse for each energetic alpha particle which enters the housing and loses its energy by ionization of the ambient air within the housing.

7. The alpha particle detector of claim 6, wherein the housing is enclosed for use under field conditions.

8. The alpha particle detector of claim 6, wherein the first electrode comprises an external electrode made substantially of wire mesh to increase sensitivity of the alpha particle detector.

9. The alpha particle detector of claim 6, wherein the external count analyzer digitizes, records and displays the count rate.

10. The alpha particle detector of claim 6, wherein the external count analyzer digitizes, records and displays an accumulation of counts over a given time.

11. The alpha particle detector of claim 6, wherein means are provided for an output voltage pulse to produce an alarm signal.

* * * * *